United States Patent [19]
Hodko et al.

[11] Patent Number: 6,145,244
[45] Date of Patent: Nov. 14, 2000

[54] METHODS FOR ENHANCING PHYTOEXTRACTION OF CONTAMINANTS FROM POROUS MEDIA USING ELECTROKINETIC PHENOMENA

[75] Inventors: Dalibor Hodko, College Station; John Van Hyfte, Bryan; Adrain Denvir; James W. Magnuson, both of College Station, all of Tex.

[73] Assignee: Lynntech, Inc., College Station, Tex.

[21] Appl. No.: 09/210,509

[22] Filed: Dec. 11, 1998

[51] Int. Cl.⁷ ............................ A01B 79/00; A01B 79/02; A01G 7/04; A01G 1/00; C21B 15/00
[52] U.S. Cl. ............................ 47/1.3; 47/1.01 R; 47/58.1; 75/711; 75/712; 210/602
[58] Field of Search .................................. 47/1.3, 1.01 R, 47/58.1; 75/711, 712; 210/602

[56] References Cited

U.S. PATENT DOCUMENTS

| | | |
|---|---|---|
| 2,831,804 | 4/1958 | Collopy . |
| 5,320,663 | 6/1994 | Cunningham . |
| 5,364,451 | 11/1994 | Raskin . |
| 5,393,426 | 2/1995 | Raskin . |
| 5,711,784 | 1/1998 | Chaney . |
| 5,728,300 | 3/1998 | Kapulnik . |
| 5,785,735 | 6/1994 | Raskin et al. .............................. 75/711 |

OTHER PUBLICATIONS

Probstein and Hicks, Removcal of Contaminants from Soils by Electric Fields, Science, vol. 260, pp. 498–503, Apr. 23, 1993.

*Primary Examiner*—David T. Fox
*Assistant Examiner*—Anne Marie Grünberg
*Attorney, Agent, or Firm*—Streets & Steele; Jeffrey L. Streets

[57] ABSTRACT

The present invention relates to a method of remediating soil, water, and other porous media contaminated with organic and/or inorganic contaminants using plants in conjunction with an electric field applied through the medium to control movement of the contaminants and enhance removal of the contaminants from the medium. Applying an electric field in soil induces electromigration (movement of ions in the pore fluid), as well as electroosmosis (movement of pore water) and electrophoresis (movement of charged particles in soil such as colloids). In the present invention these phenomena are beneficially utilized to control the transport of charged and/or non-charged contaminants in soil within the plant root zone (rhizosphere) and to bring contaminants into the root zone, perhaps from a contaminated zone located deeper in the soil than the root zone. The effectiveness of the phytoremediation is also enhanced by preventing the soil from becoming so strongly acidic or basic as to kill the plants. The present invention significantly extends the utility of phytoremediation to cleanup of soils with deeper contamination plumes than are typically accessible to the roots of plants.

44 Claims, 8 Drawing Sheets

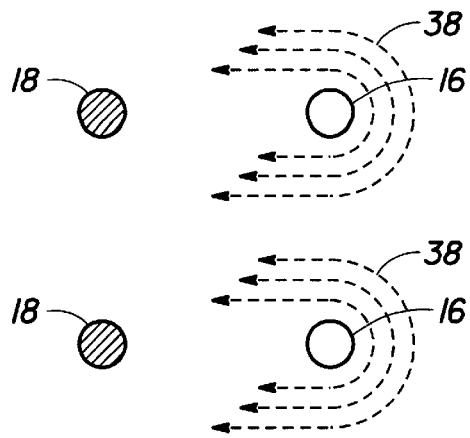
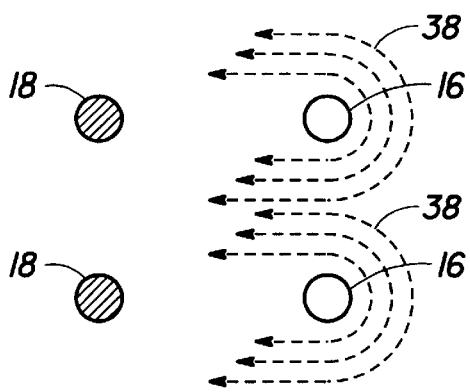
FIG. 4A          FIG. 4B
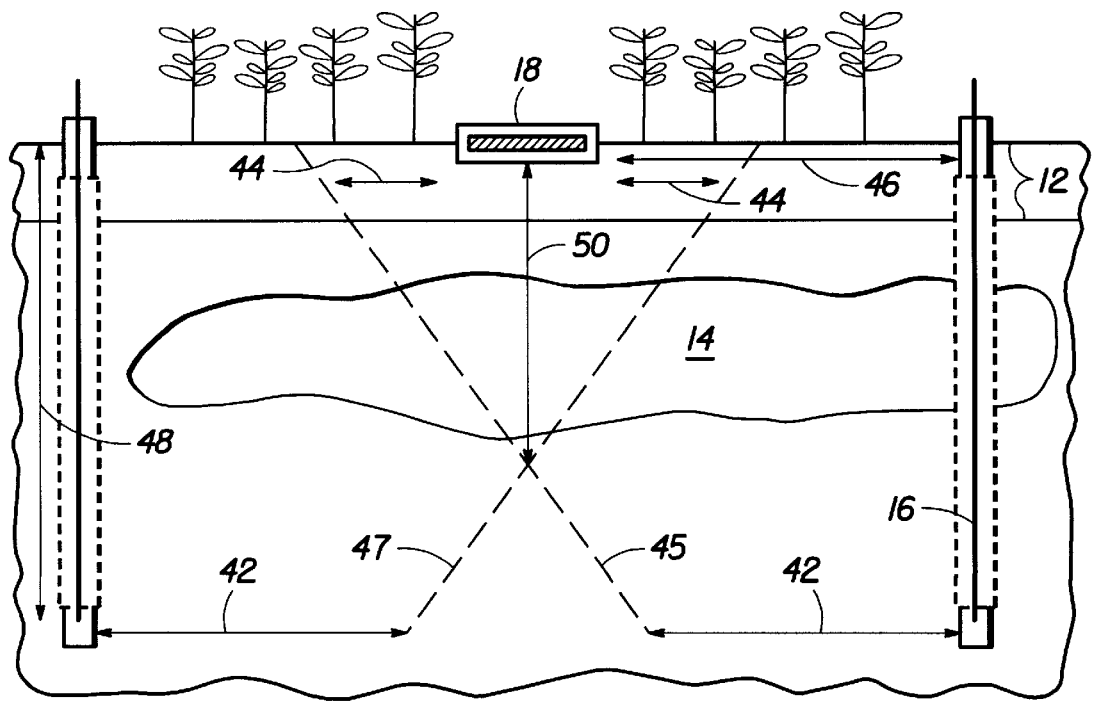
FIG. 5

METHODS FOR ENHANCING PHYTOEXTRACTION OF CONTAMINANTS FROM POROUS MEDIA USING ELECTROKINETIC PHENOMENA

This invention was made with government support under Grant DMI-9760703 awarded by the National Science Foundation (NSF). The government has certain rights in this invention.

BACKGROUND OF THE INVENTION

1. Field of the Invention

The present invention relates to methods of positioning electrodes in contaminated porous medium for applying the electricity through the medium to induce the electrokinetic phenomena in the medium and maintaining the medium pH in conditions of an applied electric field to enhance extraction of contaminants from the medium by the plants grown in the medium.

2. Background of the Related Art

Phytoremediation is a relatively new technology for cleanup of contaminated soil that uses green plants to extract, contain, or render harmless an environmental contaminant. Research is discovering that more and more plants are capable of accumulating extremely high concentrations of contaminants in their roots or aboveground shoots. Some of these plants are metal hyperaccumulators which can contain a metal concentration in their shoots that is up to 1000 times greater than normal species. Three subsets of the phytoremediation technology are already under development: (i) phytoextraction—the use of metal-accumulating plants, which can remove metals from soil into the harvestable parts of the plant; (ii) rhizofiltration—the use of plant roots to remove contaminants from polluted aqueous streams, and (iii) phytostabilization—the use of plants to stabilize contaminants such as toxic metals in soils and to prevent their entry into ground water.

A number of laboratory and field scale studies have demonstrated the potential of several hyperaccumulators for extraction or destruction of contaminants. *Brassica juncea* (mustard) has been shown to be useful for lead extraction from soil (up to 16,000 ppm lead accumulated in the plant and also the roots concentrate metals 131 to 563-fold, on a dry weight basis, above initial solution concentrations). *Helianthus annuus L.* (sunflower) accumulates copper, cadmium, chromium, nickel and zinc from aqueous solutions. The aquatic plant *Limnathemum cristatum* accumulates chromium and cadmium from solutions at metal concentrations up to 2.0 mg/l. Prairie grasses enhance bioremediation of polyaromatic hydrocarbons by improving aeration in soil and degradation capability in the rhizosphere. Alfalfa enhances microbial destruction of hydrocarbons in the rhizosphere. Populus spp. (poplar) trees are capable of enhancing evapotranspiration and mineralization to manage water and priority pollutants. Further, canola, wild brown mustard, and tall fescue are beneficial for reducing water-extractable boron and total selenium in soil.

The use of genetically engineered plants have demonstrated that an increased metal tolerance could be achieved in plants. For instance, high mercury tolerance was achieved by the introduction of metallothioneins and a semi-synthetic gene encoding MerA (bacterial mercuric ion reductase). A mutant of *Pisum sativum* was able to accumulate 10–100 fold more iron than the wild type.

Phytoremediation is an attractive approach for cleanup of soil because it is inexpensive and requires little maintenance. However, its application is limited to surface contamination only, because the cleanup depth is strictly determined by the length of the plant roots. It is a passive technology in terms of contaminant transport, the movement of contaminants in the soil is induced exclusively by a slow plant root suction and thus the efficiency of removal of contaminants depends on the extension of the plant roots in the soil subsurface.

Electroosmosis is defined as the mass flux of a fluid containing ions through a stationary porous medium caused by the application of an electrical potential. The fluid moves through the voids in the porous medium (e.g. soil) called pores. Each pore has a thin layer of charged fluid next to the pore wall having a typical thickness of between about 1 and about 10 nanometers. The thin layer of charged fluid next to the pore wall is present to neutralize the charge (typically a slight negative charge) on the surface of the soil particle that forms the pore wall. Fluid movement occurs in soil pores because of the charge interaction between the bulk of the liquid in the pore and the thin layer of charged fluid next to the pore wall. Under the influence of a DC electric field, the thin layer of charged fluid moves in a direction parallel to the electric field. Large amounts of liquid may be transported along with the thin layer of charged fluid as well as contaminants or other species contained within the liquid. Electroosmosis is most effective in fine-grained soils, such as silty or clayey soil, where hydraulic transport of water, such as pumping or irrigating, is not feasible. Electroosmosis is used in electrokinetic remediation to remove non-charged organic contaminants by electrical pumping of contaminated pore water from soil.

Electromigration is defined as the mass flux of a charged ionic or polar species within a liquid or solution from one electrode to another electrode. Electromigration and electroosmosis may occur simultaneously and are the dominant mechanisms through which conventional electrokinetic transport processes occur.

Electroosmosis has been used as a method for dewatering soils and sludges. The fundamentals of this method were established through the work of Casegrande and Grey. During the 1970's, electrokinetic metal recovery was used as a method for mining metals such as copper. These processes involved inserting electrodes enclosed within porous enclosures or wells into the ground. The enclosures are then filled with an electrolyte, typically an acid.

One recent application in which electrokinetic transport of materials has found practical use is the electrokinetic remediation of contaminants in soil. Electrokinetic remediation, frequently referred to as either electrokinetic soil processing, electromigration, electrochemical decontamination or electroreclamation, uses electrical currents applied across electrode pairs placed in the ground to extract radionuclides, heavy metals, certain organic compounds, or mixed inorganic species and organic wastes from soils and slurries. Electrokinetic remediation of contaminated soils can be applied to fine grain soils and operates efficiently in soils with hydraulic conductivity lower than $10^{-4}$ cm s$^{-1}$. In such low hydraulic conductivity conditions, the hydraulic transport of fluids, e.g., pumping or irrigating, is not feasible.

During electrokinetic processing, water in the immediate vicinity of the electrodes is electrolyzed to produce $H^+$ ions at the anode and $OH^-$ ions at the cathode, causing the pH of the soil to change, according to the following equations.

Anode Reaction $$2H_2O \rightarrow O_2 + 4e^- + 4H^+ \qquad \text{Equation (1)}$$

Cathode Reaction $$2H_2O + 2e^- \rightarrow H_2 + 2OH^- \quad \text{Equation (2)}$$

If the ions produced are not removed or neutralized, these reactions lower the pH at the anode and raise the pH at the cathode. Protons formed at the anode migrate towards the cathode and can aid contaminant removal by increasing metal extraction. In contrast, the hydroxyl ions formed at the cathode do not migrate as efficiently as protons and can increase the soil pH in the cathode region, as high as a pH of 12, and cause deposition of insoluble species, thereby forming regions of high electrical resistivity.

U.S. Pat. No. 5,785,735 (Raskin) discloses a method for manipulating a soil environment by applying an electric field in the soil to increase the mobility and availability of metals to the root systems of plants capable of absorbing and retaining the metals. Raskin also discloses that the adjustment of soil pH below pH 5.0 by addition of organic or inorganic acids can be utilized to enhance the metal availability to the plants. However, there is a central dilemma regarding the survivability and growth of plants in conditions of low pH or where an electric field is applied through the soil.

There remains a need for a phytoremediation process that enhances the accumulation of metals in plants. More particularly, there is a need for a phytoremediation process that removes metal from soil below the root zone of plants and maintains healthy plant growth.

SUMMARY OF THE INVENTION

The present invention relates to a method of remediating soil, water, and other porous media contaminated with organic and/or inorganic contaminants using plants in conjunction with an electric field applied through the medium to control movement of the contaminants and enhance removal of the contaminants from the medium. Applying an electric field in soil induces electromigration (movement of ions in the pore fluid), as well as electroosmosis (movement of pore water) and electrophoresis (movement of charged particles in soil such as colloids). In the present invention these phenomena are beneficially utilized to control the transport of charged and/or non-charged contaminants in soil within the plant root zone (rhizosphere) and to bring contaminants into the root zone, perhaps from a contaminated zone located deeper in the soil than the root zone. The present invention significantly extends the utility of phytoremediation to cleanup of soils with deeper contamination plumes than are typically accessible to the plant roots.

The method includes applying electrokinetic effects to efficiently distribute reagents or chemicals in soil, e.g., to enhance the solubility of heavy metals in soil by adding complexing agents, or to enhance the solubility of organic contaminants by transporting surfactants through the soil toward the rhizosphere. In another embodiment, the method utilizes the electrokinetic phenomena to deliver nutrients and water needed for plant growth.

In one of the preferred embodiments, the present invention utilizes the electrokinetic transport of hydrogen ions and/or hydroxyl ions within or toward the rhizosphere zone to enhance the solubilization of metal contaminants adsorbed on soil and to increase the efficiency of the phytoremediation process.

The present invention teaches how to apply an electric field through the soil without harming the plants and how to use electrokinetic phenomena in soil to enhance the contaminant accumulation in the plants.

BRIEF DESCRIPTION OF THE DRAWINGS

So that the above recited features, advantages and objects of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIGS. 4a–4b are a schematic diagram of electric field lines in a porous medium with respect to spacing of like-charge electrodes positioned in the porous medium.

FIG. 5 is a schematic diagram of a process for determining the depth of positive electrodes used in the invention with respect to negative electrodes, contaminants location and plants grown in the porous medium.

DETAILED DESCRIPTION OF THE INVENTION

Figure 1:
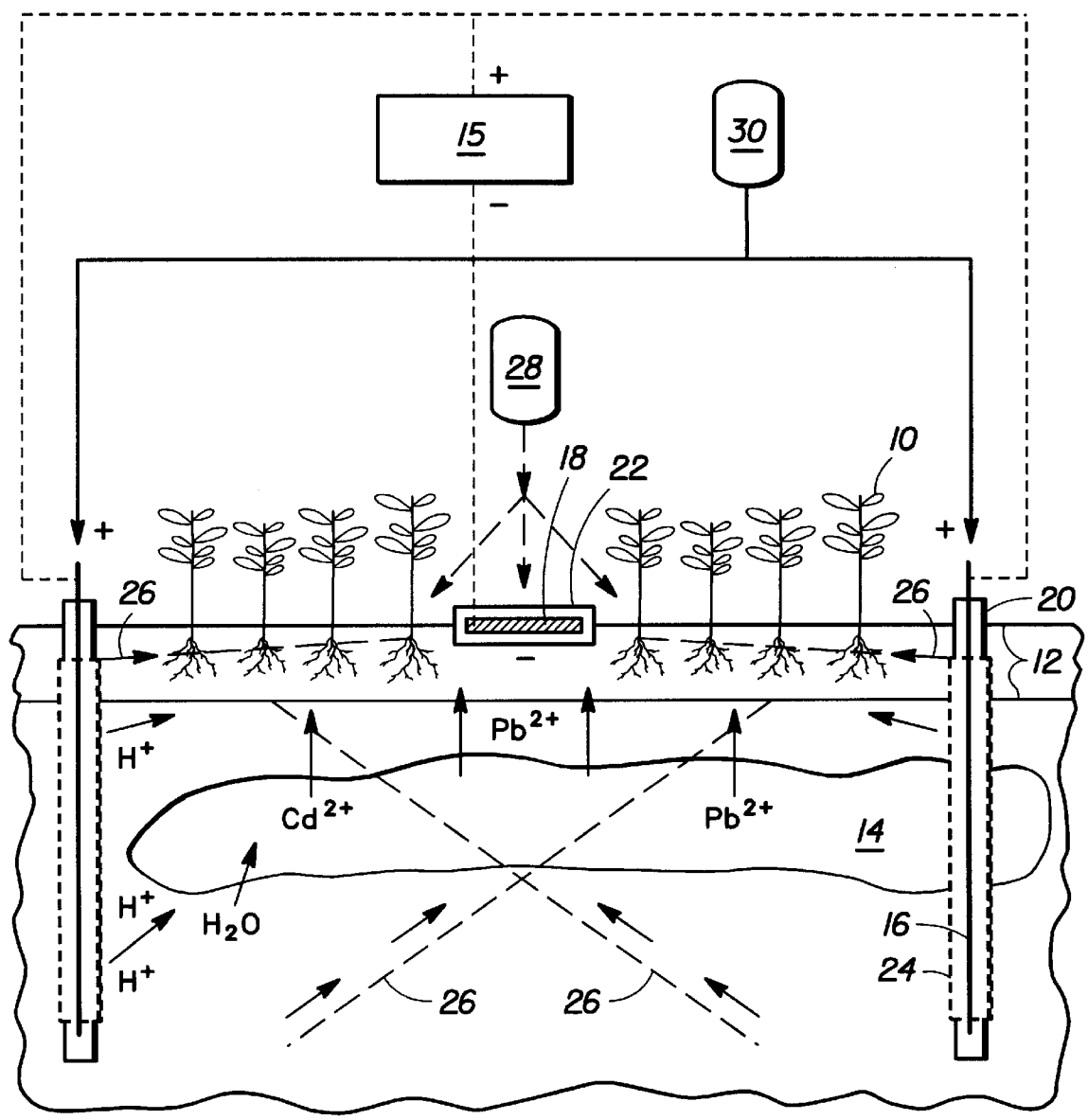
FIG. 1 is a schematic diagram of a process of the present invention for removal of contaminants from porous medium by applying an electric field in a porous medium and using plants for extraction of contaminants.

The present invention generally provides methods of positioning electrodes in a contaminated porous media useful for applying electricity through the media to induce electrokinetic phenomena throughout the media and methods of maintaining the pH of the media while using an applied electric field to enhance extraction of contaminants from the media by plants growing in the media. As used herein, the term "porous medium", "medium" or "media"

refers to soil, sediment, sludge, groundwater, composted material, or any medium that supports plant growth. The term "soil" is used as an equivalent to the term "medium" or "media" such that statements regarding soil are also valid for all other media defined above. The term contaminant refers to both charged contaminants, e.g., heavy metals, (lead, chromium, cadmium, copper, nickel, etc.), and non-charged contaminants, e.g., organic contaminants (hydrocarbons, chlorinated hydrocarbons, polyaromatic hydrocarbons, etc.).

The two technologies, phytoremediation and electrokinetic soil treatment are highly compatible because both are in situ technologies and the combination of these technologies will yield an efficient combined technology for contaminant removal from soils. The combined technology will overcome the problems encountered by the individual technologies, namely the phytoremediation problem of applying phytoextraction to deep subsurface contaminant plumes and the electrokinetic remediation problem of slow and long term accumulation of contaminants in distant electrode wells. By combining these two technologies, the contaminants are electrokinetically transported and accumulated in the rhizosphere where plant roots serve as high surface area extraction devices. At a majority of heavy metal contaminated sites, the metal contamination decreases with depth, and is usually accumulated and exceeds allowed concentrations down to a depth of between about 3 and about 6 feet. The process of phytoremediation of metal contaminated soil using popular plants, such as *Brasica juncea*, is efficient only to a depth of between about 2 and about 3 feet, depending on the plant root length and the growth period when the plants are harvested. Thus, most of the metal contaminated sites cannot be treated using phytoremediation alone.

Electrokinetic soil remediation is performed by inserting electrodes into electrode wells and horizontally transporting contaminants from one well to the other. At remediation sites where the soil conductivity is high, the electrode well spacing can be as far as 28 ft. However, taking an average electrokinetic transport rate of contaminants in soil as about 2 centimeters per day, it will take approximately 14 months to transport the contaminants to a distance of 28 ft. Assuming that a vertical, counter-gravitational contaminant transport is possible by electrokinetics, at this rate, the contaminants transport from a depth of about 6 feet up to a depth of about 3 feet will be accomplished within only about 1.5 months. Thus, if the contaminants are simultaneously extracted from soil by plants having their roots at a depth between about 2 and about 3 feet, the process time can be reduced more than 10 fold. Increasing the number of the electrode wells (decreasing the electrode spacing) can reduce the electrokinetic remediation process time, however, this will significantly increase the treatment cost. Also, in the above example, the soil treatment depth reachable by the phytoremediation process is increased 2 fold (from 3 ft to 6 ft), thus extending the applicability of the phytoremediation process to a majority of sites contaminated by heavy metals.

Electrokinetics will successfully operate in deeper soil layers, and no restrictions with respect to the contaminant plume depth are envisaged. If the contamination is located deeper in soil, the timing of the plant growth to achieve high plant mass should coincide with the accumulation of contaminant transported electrokinetically into the rhizosophere from deeper soil layers.

The present invention also provides methods for determining optimum distances between the electrodes and the size of the electrodes with respect to the location of the contaminant plume and the plants. In particular, the electric field intensity, the electrode geometrical arrangements and soil pH control are determined so that the health of the plants is unaffected by the applied electric field, yet the contaminant phytoextraction is enhanced by the electrokinetic phenomena induced by the applied electric field. Phytoextraction means extraction of contaminants from soil by the roots and/or shoots of plants that have the capability of accumulating contaminants in excess of about 100 ppm (mg/kg dry weight of plant tissue).

FIG. 1 is a schematic view of a process for in situ remediation of contaminated soil by combining phytoremediation and electrokinetic soil remediation which utilizes an array of electrodes and electrode wells positioned in a region of soil between the rows of contaminant accumulating plants 10. The process is well suited for use in soil where the contaminants are partially or entirely inaccessible to the plants, because at least a portion of the contamination plume 14 is located below the root zone 12. This embodiment of the invention shows that the process of the present invention may be used for remediating soil having a contaminant plume that is sufficiently deep that phytoremediation alone is not applicable. However, the same principles of positioning the electrodes and applying the electric field are applicable where contaminants are located within the rhizosphere and an electric field is used to enhance the contaminant phytoextraction from soil.

FIG. 1 shows a soil polluted by charged contaminants—heavy metals, lead ($Pb^{2+}$) and cadmium ($Cd^{2+}$). The anodes 16 and the cathodes 18 are connected to a source of a direct current supply 15. The anodes 16 are situated in a porous casing 20, preferably ceramic tubing, which provides low hydraulic permeability and contains the well solution. The porous material used for the well must have a large open area in order to avoid obstructing the flow of electric current to the soil. The anode 16 is preferably made of a non-corrodable metal alloy such as iridium oxide coated titanium. The cathode 18, which is shorter than the anode, is positioned near the soil surface and is embedded into a porous casing 22, such as a ceramic material, bricks or a covering of clayey material like kaolinite or bentonite. The cathode can be made of any metal, preferably stainless steel, because it is cathodically protected during the process and will not corrode. The size and distance of the anode with respect to the cathode is chosen so that the electric field lines are directed from the anodes toward the cathodes. The anode well screen 24 (porous area of the well casing) determines the length through which an electric current is applied to the soil, and so determines the depth of the electric field.

Because the anode is longer and is positioned deeper in the soil than the cathode, the electric field lines are directed upward toward the cathode. The length of the anodes and/or the well screen area is determined by the depth of the contaminant plume and by the distance between the cathodes and anodes. To achieve efficient counter-gravitational electrokinetic transport of contaminants from the plume 14 toward the root zone 12, the electric field lines 26 from the bottom of the anode well 20 toward the cathode well 18 will preferably encompass the contaminant plume 14, as shown in FIG. 1. The arrangement shown in FIG. 1 is applicable when contaminants in soil are positively charged, such as cadmium and lead ions. These ions are transported toward the cathode 18 and/or toward the plant root zone 12 by electromigration. In addition, the upward, counter-gravitational transport of charged contaminants, such as lead and cadmium ions is enhanced by electroosmosis which occurs in the direction from the anode 18 toward the cathode 18. Once the contaminants reach the rhizosphere 12, they are extracted from soil by numerous plant roots.

Critical to the success of the combined electrokinetic phytoremediation process is the timing between the contaminant transport to the root zone and the plant growth. The contaminant transport rate is controlled by the voltage applied between the anodes and cathodes. Thus, it is preferable that the contaminants reach the root zone 12 during a time period in which the plants have achieved a substantial plant mass capable of extracting large amounts of contaminants.

The electrokinetic transport of the contaminants continues within the root zone 12, which makes contaminants more available to the plant roots. In conditions where no electricity is applied the contaminants are extracted by plant suction mechanism, a process limited by diffusion of metal ions through the soil. When an electric field is applied, the contaminants are supplied to the plant roots continuously and at a much faster rate. The plants reach their maximum contaminant accumulation capacity within a shorter period of time than plants grown in the absence of an electric field. In this way the accumulation of the contaminants in the plants shoots and/or roots is significantly accelerated.

Once the plants reach a maximum capacity for accumulation of contaminants, the plants die and are harvested followed by the planting of new plants. The quick accumulation of contaminants in plants under the electric field applied allows that the subsequent seeding of the plants occurs sooner, thus providing more crop cycles within one plant-growing season. The metal accumulating plants, e.g., *Brassica juncea,* are typically harvested after 4–6 weeks. When the new plants are seeded, the application of the electric field can be stopped until the plants approach the stage of harvesting. The electric field is applied when the plant mass is large and ready for metal accumulation, for *Brassica juncea* this is before the plant flowering. In this particular plant, a majority of metal contaminants are accumulated in the leaves.

By applying the electricity only at the stage when the plants exhibit maximum contaminant accumulation rate, significant process cost savings are achieved by reducing the power consumption needed for the electrokinetic transport. At the same time the process of contaminants accumulation by the plants is significantly shortened.

Applying an electric field in soil causes an acid front (labeled $H^+$ in FIG. 1) to move into the soil from the anodes 16 and a base front to move into the soil from the cathodes 18 (see Eq 1. and Eq 2.). The present invention utilizes the acid created in the anode well to acidify the soil containing the contaminant plume and enhance the solubility of the metals in soil thereby enhancing the phytoextraction in the root zone by the plants. The contaminants strongly adsorbed on soil within the plume are transferred into the pore fluid and transported to the rhizosphere. At the cathode, a base is formed which can cause undesirable precipitation of metal hydroxides near the cathode and an increase in soil resistance.

Metal hydroxide precipitation is prevented by controlling the pH in the cathode well 18 or in the soil surrounding the cathode. An environmentally benign organic acid 28, such as citric acid or acetic acid, is added to the cathode well to neutralize the base formed in the cathode. Alternatively, the acid 28 can be sprinkled along the cathodes 18 if the design includes a cathode well trench covered by a porous material, such as ceramic material and clayey material such as kaolinite and bentonite. In addition, the anions of the organic acid added to the cathode, such as citrate anions, are transported from the cathode toward the anode by electromigration. These anions can form complexes with metals adsorbed on soil and enhance their solubility in the pore fluid.

Typical metal accumulating plants, such as *Brassica juncea,* can survive in soil pH as low as 3.5–4. However, the acid front advancing into the soil from the anode can cause soil pH to become too low for plant growth. To keep the soil pH above that limit, a base 30, such as sodium hydroxide or lime, is added to the anode well to control the pH of the electrochemically produced acid.

When the metal contaminants are negatively charged, such as chromate, pertechnate or similar metal anions, the electromigration of the contaminants is from the cathode toward the anode. Consequently, it is preferred to position an anode near the soil surface and position the cathodes deeper in the soil. Because the movement of the acid front is from the soil surface downward, stricter pH control of the anode wells is needed to prevent the soil pH from dropping too low within the root zone and harming the plants. Also, multibase organic acids, such as citric acid, can be used in the cathode. When the anions of the multibase acids are transported into the soil and dissociate in water, some of them carry hydrogen ions, which subsequently dissociate from the anion and are released into the pore fluid where the hydrogen ions lower the pH of the pore fluid. Adding a higher concentration of citric acid in the cathode well will cause the transport of citrates from deeper soil layers toward the soil surface and will acidify the contaminant plume and enhance the solubility of anionic metal contaminants.

Another embodiment of the present invention provides a phytoremediation process for extracting non-charged organic contaminants from soil. The process utilizes electrokinetic phenomena, particularly electroosmosis, to transport organic contaminants present in the pore fluid toward and/or within the root zone of plants capable of absorbing organics. Electroosmosis causes transport of water containing dissolved organic contaminants from the anodes through the soil pores toward the cathodes positioned within the rhizosphere. The addition of surfactants to the soil, such as through the electrode wells from either container 28, 30 shown in FIG. 1, enhances the solubility of residual organic contaminants in soil and increases the efficiency of organic contaminant removal.

Another embodiment of the invention provides electrodes inserted directly into soil and not into the electrode wells. These electrodes are made of corrosion resistant materials such as, but not limited to, iridium oxide coated titanium expanded mesh. After insertion into the soil, the electrodes are sealed with surrounding soil or added clayey materials such as bentonite, kaolinite and mixtures thereof. The acid or base needed for the pH control of soil in the vicinity of the cathodes and anodes is delivered by sprinkling. The soil conductivity between the electrodes is increased by sprinkling water and/or nutrients needed for the plant growth, thereby enhancing the electrical current through the soil and decreasing the energy cost.

Yet another embodiment of the invention provides a phytoremediation process for use in soil which does not support plant growth, such as clayey soil where the plant roots cannot penetrate through tight pores, extremely high or low pH soil, or soil having a contaminant concentration that is too high for successful plant growth. The process comprises adding a layer of porous material, for example sandy soil, silty soil or even an artificial porous material such as polymeric foams, in which the plants can grow. The system is arranged in the same way as shown in FIG. 1, except that the layer of porous material that defines the root zone is added on top of the contaminated soil. The contaminants are electrokinetically transported from the contaminated soil, which does not support the plant growth to the added soil layer, or porous medium, in which the plants are grown. It is believed that once the site is remediated, this top layer can optionally be removed as well and reused on another site.

Still another embodiment of the invention provides a phytoremediation process for remediating a contaminant plume located within the rhizosphere. Using the system in accordance with FIG. 1, the extraction of contaminants within the rhizosphere is enhanced due to the induced electrokinetic transport of the contaminants within, throughout or across the rhizosphere. It should be recognized that the processes of the present invention may be simultaneously or sequentially used in both the rhizosphere and soil adjacent to the rhizosphere.

With regard to any or all of the foregoing embodiments, the distance between the anodes 16 and cathodes 18 directly effects the amount of time required to electrokinetically transport the contaminants from the contaminant plume 14 to the cathode 18 or root zone 12. Thus, to adjust the timing of the contaminants arrival to the root zone 12 and the plant growth to a stage when the plants reach satisfactory dry mass for contaminant accumulation, one needs to determine the contaminant movement rate in soil under the applied electric field, for instance in centimeters per day. This is achieved in a laboratory experiment using an undisturbed soil sample from the site and applying the electricity through the sample between two electrodes positioned in the sample. The movement of the contaminant is measured by talking soil core samples or pore fluid samples between the electrodes at different times and determining the contaminant concentration at different locations between the electrodes. A similar determination can be made in the field, by inserting into the soil a smaller anode and a smaller cathode compared to electrodes used in the process, for example about 1 to about 2 feet apart and about 2 feet deep in the soil. The electricity is applied and the movement of the contaminants measured by taking core samples as described above. The duration of the test is short because the distance between the test electrodes is shorter than the distance between the process electrodes. Because the electrokinetic transport rate is proportional to the voltage and/or current applied, several applied voltages can be tested to determine an optimum, or at least suitable or effective, contaminant transport rate with respect to the time required to transport the contaminants from the plume into the rhizosphere.

If either the contaminant plume is very deep or the electrokinetic transport is too slow compared to the plant growth, the electrokinetic process can be started before the plants are seeded in order to provide enough time to transport the contaminants to the rhizosphere zone and accumulate the contaminants in the rhizosphere at an acceptable concentration level for healthy plant growth and metal extraction. An "acceptable concentration level" is defined herein as those concentration of metals in soil at which the plant will not reach its maximum capacity for accumulation of contaminants in an early stage of the growth. At early stages of the plant growth, the plant mass is small and it can accumulate only low amounts of metals. If the metal concentration in soil is too high, the plants will prematurely die. In the present invention active, controlled electrokinetic transport of contaminants into or within the root zone is used to deliver an appropriate dose of metals to the plants, so that the plants will live to grow a high plant mass and achieve their maximum capacity for accumulating metals or contaminants. This increases the total amount of contaminant removed from soil in one crop cycle.

Figure 2A:
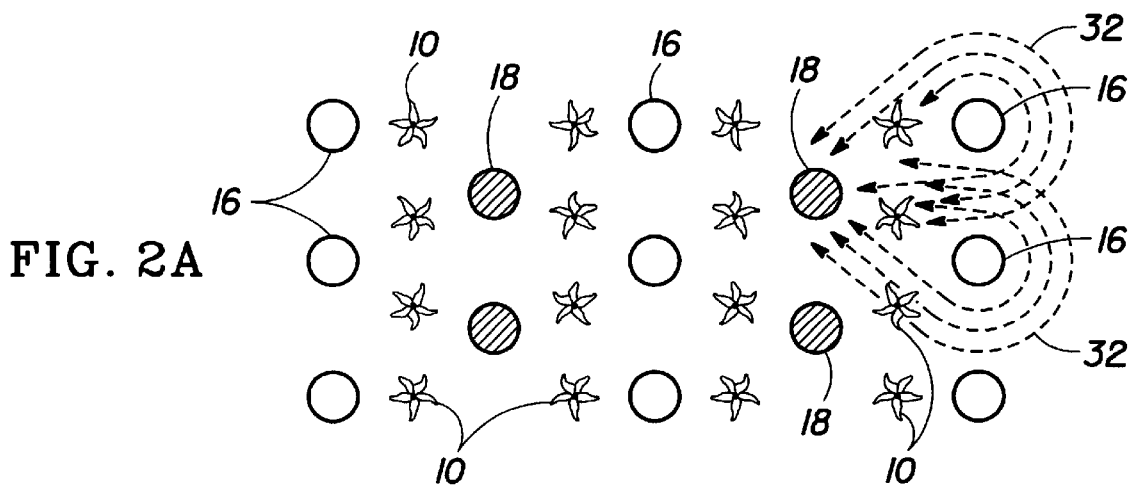
FIGS. 2a and 2b are schematic top views of two arrangements for an array of electrodes used in the present invention.
Figure 2B:
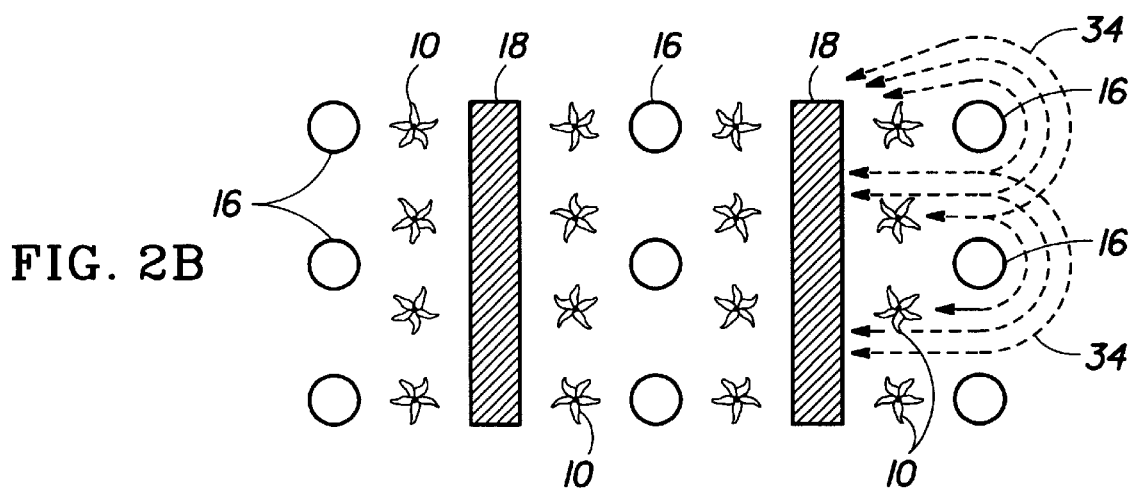

FIGS. 2a and 2b are schematic top views of two arrangements of an electrode well array consisting of rows of anodes 16 and cathodes 18 with respect to the position of the contaminant accumulating plants 10. One or more rows of plants are located between an anode and a cathode row. In FIG. 2a one cathode 18 is surrounded by four anodes 16, in this way the electric field lines 32 are directed from several anodes toward one cathode which enhances the accumulation of the contaminants around the cathode. As shown in FIG. 2a, this is especially effective for the transport of positively charged contaminants and for contaminants transported by electroosmosis. In the case of negatively charged contaminants, a similar arrangement can be made where four cathodes surround one anode. This may be accomplished by reversing the polarity of the electrodes of FIG. 2a.

FIG. 2b shows parallel electric field lines 34 directed from the anode wells 16 toward horizontal or "trench" cathodes 18. The electric field lines around an electrode well positioned in the soil resemble magnetic field lines established around magnetic poles. FIGS. 2a and 2b show how the electric field lines also extend behind the row of anodes 16. The contaminants can be accumulated from up to about 2 to about 5 feet from outside the treatment area encompassed by the electrodes toward the treatment area, depending on soil conductivity.

It is very important to position the electrode wells in the soil so that the distance between the wells of same kind or polarity, e.g., anode to anode, or cathode to cathode, is shorter than the sphere of influence of the electric field originating from those two neighboring wells. In this way it is assured that the decontamination will occur uniformly between the wells and no untreated area will be left. The sphere of influence of one electrode well is determined by the electric field lines, i.e., the lines of same voltage with respect to distance from that well. The distance between two wells of the same kind should be chosen so that the electric field lines from two neighboring wells overlap sufficiently to decontaminate the area. The present invention teaches methods for determining the depth and spacing of the electrode wells with respect to the position of the contaminant plume and the plant roots.

The optimum spacing between electrode wells of the same kind is determined in a short field test by installing one or two cathode wells and several anode wells in soil which are positioned at two or three different spacings between them. Determination of the sphere of influence of the electric field around a particular anode well and overlapping of the electric field lines from the two anode wells positioned at a particular spacing is performed by inserting a number of voltage probes into the soil between and around those wells. The voltage probes are preferably made of a non-corrosive metal rod, such as stainless steel 316, and are insulated over a substantial portion of the rod using shrinkable plastic tubing. Both ends of the voltage probe are left exposed to provide the contact and a voltage sensing point in the soil at a particular depth.

Figure 3:
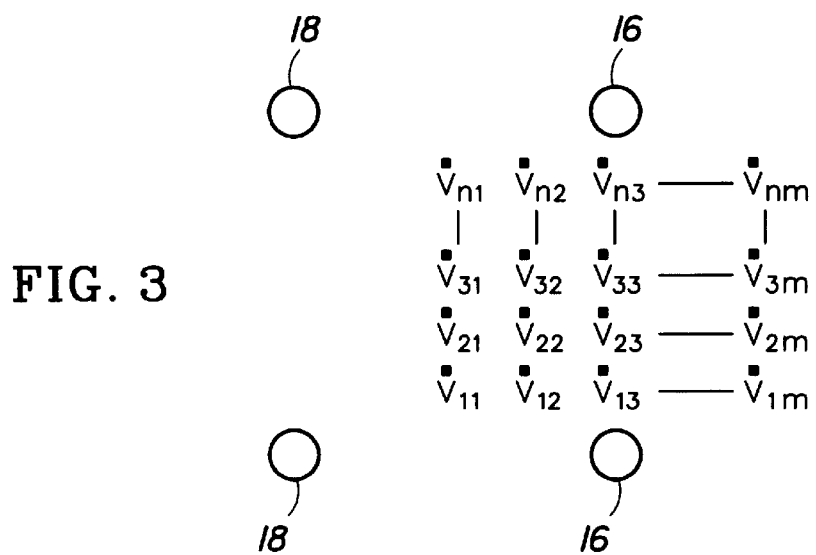
FIG. 3 is a schematic diagram of a process for determining the positioning of electrodes in the present invention using voltage probes inserted in the porous medium between the electrodes.

The arrangement of voltage probes in the soil can be circular surrounding the wells, in square patterns, or any other known arrangement. The voltage probes are preferably inserted in soil at equal spacing from the wells and between the probes in order to facilitate calculation of electric field strength. A typical arrangement 36 of voltage probes is shown in FIG. 3. The probes are labeled $V_{11}$ to $V_{nm}$, where n denotes a row of voltage probes with respect to the distance from the anode well and m denotes a column where the probes are located. Thus, $V_{11}$ means that the probe is located in the first row closest to the anode well 16 and in the first column. The second row is located at twice the distance from the well compared to the first row, third row three times the distance of the first row, etc.

When an electric field is applied between the anodes 16 and cathodes 18, the voltages between the neighboring voltage probes are measured using a floating voltmeter. Alternatively, voltages from each probe can be measured with respect to a ground probe positioned about 100 to about 200 feet from the treatment area so that the electric field applied within the treatment area has no effect on the ground probe. The voltage differences are measured between the probes in the second row and the first row, between the probes in the third row and the second row, etc. In this way a set of voltage differences $V_{n,m}-V_{n-1,m}$ is obtained. The electric field is calculated as: electric field=voltage difference between two neighboring probes/distance between the probes. If all the probes have been equally spaced, then the changes in voltage difference (or voltage drop) between the neighboring voltage probes reflect the changes in the electric field in soil. Each pair of voltage probes determines a voltage drop or change in the electric field at a particular location with respect to the well.

This method provides screening of the applied electric field lines at different distances from the well. The electric field thus measured decreases with distance from the well 16, for example down to about 5% of the electric field measured near the anode. Based on these measurements, a sphere of influence of a particular electrode well can be determined.

FIG. 4a is a schematic diagram of two anode wells 16 positioned so that their spheres of electric field influence 38 do not overlap. The removal of contaminants from soil in this case will not be complete, because the contaminants between two spheres of influence will not be removed. FIG. 4b is a schematic diagram of two wells of same polarity, anodes 16, where the electric field lines overlap. The overlapping of the electric field lines is considered satisfactory when the voltage drop between two neighboring probes at the point of the overlap of the spheres of influence 38 is greater than about 5 to about 10 percent of the voltage drop measured near the well 16. By determining the electric field lines around the electrode wells positioned at varying distances, an optimum, or at least suitable or effective, spacing between the electrode wells of the same polarity (i.e., anodes and anodes or cathodes and cathodes) can be accurately determined.

In a highly conductive soil, instead of using voltage probes, current probes can be used to determine the sphere of electric field influence around the electrode wells. In this case the probes are used as electrode wells, i.e., the current is passed through the probes and measured at each individual probe located at varying distances from a fixed cathode (or anode well). These probes are designed so that their sensing tip is made ionically conductive. This could be achieved by making the probe out of a non-corrosive tube, e.g., iridium oxide coated titanium, and perforating the tip to allow a conductive solution to be introduced in the soil at the tip. For example, this could be achieved by injecting a sodium choloride solution into the probe. In this manner the resistance between the probe and the soil is minimized, so that only soil resistance in between the probes determine the current flow. The current probes can be efficiently used to determine the soil resistance uniformity, i.e., to determine soil vertical of horizontal layers of higher resistance within the treatment area. The vertical current distribution is obtained by sequentially lowering the probes deeper into the soil.

Once the spacing between the electrodes of same polarity is obtained, then the depth of the anodes and the positioning of the cathodes in the root zone are determined. FIG. 5 is a schematic diagram which graphically demonstrates how to determine an effective depth of the anode 16 with respect to the cathode well 18 located within the root zone 12. First, the spheres of the electric field influence, determined as described above, are marked at the bottom of the anode well 42 and around the cathode well 44. Then for each anode/cathode pair, a remediation zone is established which encompasses the region of soil lying between the two spheres of influence. This remediation zone is graphically represented by lines 45, 47 drawn from the bottom of the anode spheres of influence to the cathode sphere of influence at the soil surface. For any fixed distance 46 between the anodes and cathodes, determined from overlapping of the electric field lines as described above and from the laboratory ion migration tests, the depth 48 of the anodes 16 can be determined so that the adjacent remediation zones encompass the entire contaminant plume, i.e., lines 45, 47 cross at or below the bottom of the plume 50. This configuration of electrode wells assures that the entire region containing the plume will be subject to the electric field for transporting contaminants into the rhizosphere 12 for extraction by the plants.

Control of the soil pH is one of the main factors for successful operation of the combined electrokinetic phytoremediation process. Extreme soil pH will cause plants to wither. One way to neutralize the base produced at the cathode is to add an organic acid to the cathodes. Also, the pH of the acid front penetrating into the soil from the anodes can be controlled by adding base to the anodes.

Figure 6A:
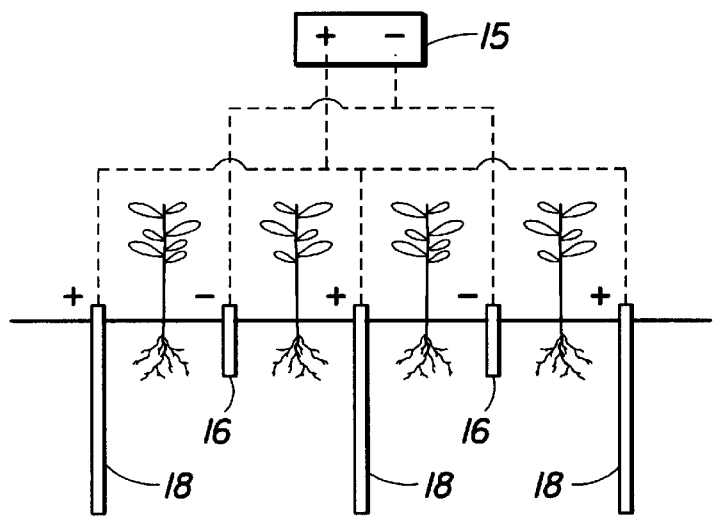
FIGS. 6a and 6b are schematic diagrams showing the electrodes having reversed polarity.
Figure 6B:
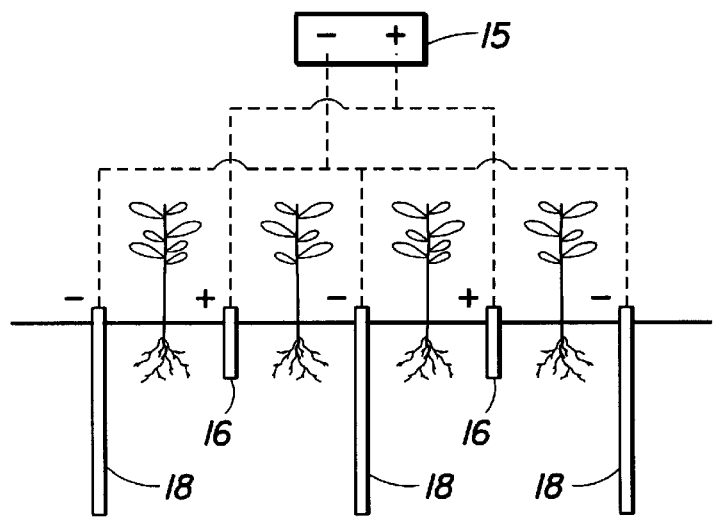

In another embodiment of the invention, the soil pH is controlled by reversing the polarity of the electrodes. FIGS. 6a and 6b illustrate how the polarity of an array of electrodes (anodes and cathodes) is switched. In accordance with FIG. 6a, a first set of electrodes are connected to a positive pole of the constant current power supply to form anodes and a second set of electrodes are connected to a negative pole to form cathodes. In this configuration hydrogen ions are transported from the first set of electrodes (anodes) located deep in the soil toward the second set of electrodes (cathodes) at the surface. Because hydrogen ions have a higher transport number than hydroxyl ions entering the soil from the cathodes, hydrogen ions penetrate further toward the cathodes than the base toward the anodes. This means that the acid front moves faster through the soil compared to the base front. The overall effect is then acidification of soil.

In accordance with FIG. 6b, the polarity of the first and second sets of electrodes is reversed such that the first set of electrodes form cathodes and the second set of electrodes form anodes. In this manner, the extent of the acid and base front penetration though the soil and the soil pH can be controlled by reversing the polarity of the electrodes. The intervals of time over which the electrodes are maintained at one polarity or the reversed (opposite) polarity may be the same or different. Thus, the rows of electrodes 18 (shown as anodes in FIG. 6a) can be connected to a positive pole of the power supply for a longer period of time than the electrodes 18 are connected to the negative pole (forming cathodes as in FIG. 6b). This introduces asymmetry in the penetration of the acid and base front and allows the soil pH to be decreased slowly to levels which will not harm the plant growth, yet will increase the solubility of the metal contaminants. For instance, a desirable soil pH for optimum extraction of metals by *Brasica juncea* is between about 3.5 to about 4.5.

Figure 7:
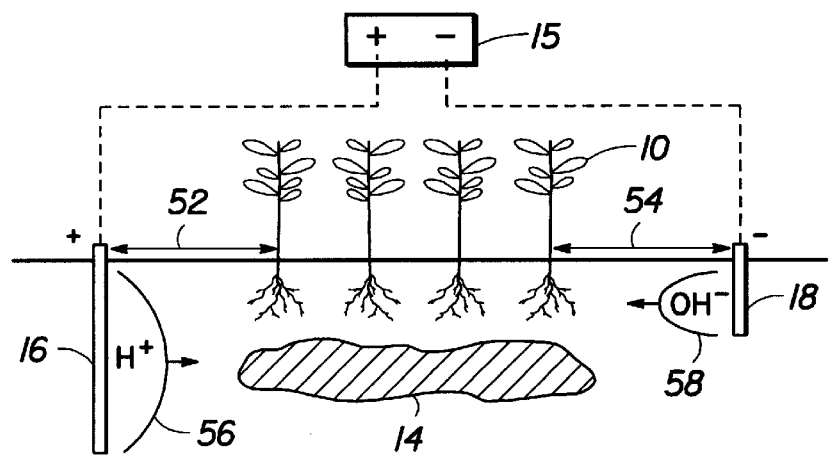
FIG. 7 is a schematic diagram of a process for controlling the pH of the porous medium by positioning electrodes in the medium with respect to plants grown in porous medium.

Another embodiment of the invention provides an arrangement of electrodes that control acid or base front penetration from the electrodes into the root zone by properly positioning the electrodes in the soil as shown in FIG. 7. Since electrical current is transported through the soil by ion movement, then ions within the root zone, including contaminant ions, are still transported electrokinetically. As shown in FIG. 7, this embodiment preferably uses only one row of anodes 16 and one row of cathodes 18. The anodes are positioned at a distance 52 from the plant field and cathodes at distance 54. Both distances 52, 54 are chosen so that the penetration of the acid front 56 and base front 58 does not reach the plants during the entire soil treatment process. In this embodiment, electrokinetics enhances the transport of contaminants within the root zone and helps the distribution of nutrients needed for plant growth and chemicals added to soil to enhance the solubilization of the contaminants.

The invention described herein is illustrated by the following examples.

EXAMPLE 1

Germination and Plant Growth under an Applied Electric Field

Lettuce seeds, *Lactuca sativa*, cv grand rapids, were placed between two gold wire electrodes embedded in a layer of agar gel poured in a square 10 cm×10 cm Petri plate. After two days of germination an electric field (constant current=100 mA) was applied across the electrodes.

Figure 8:
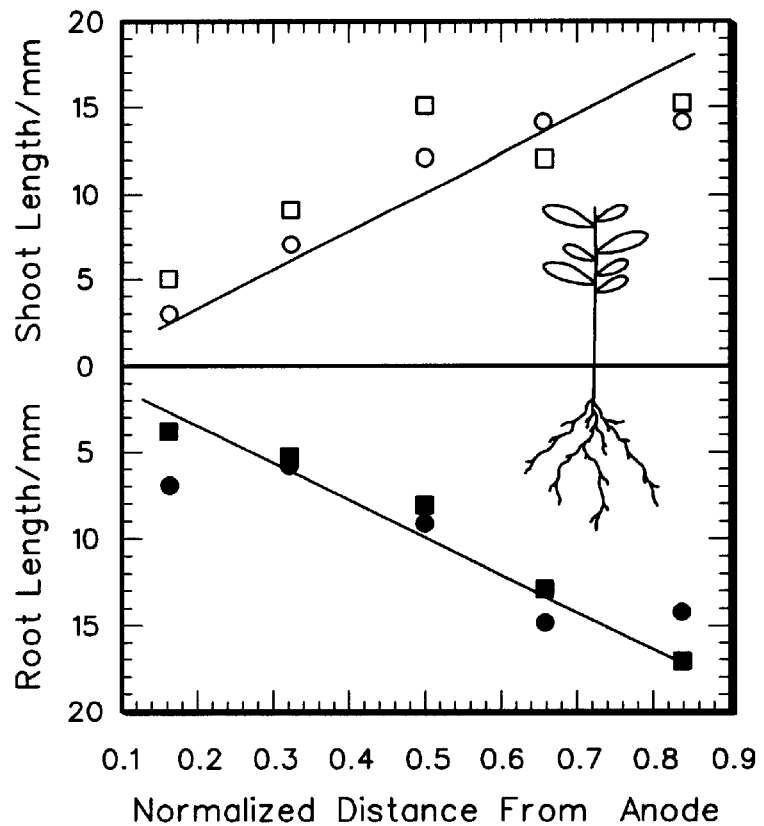
FIG. 8 is a graph of the plant shoots length and plant roots length as a function of the normalized distance between the electrodes and the plant.

The experiment was performed in the dark and at a room temperature of 22±1° C. After 6 days of growth, shoot and root length was measured. Results are shown in FIG. 8. FIG. 8 clearly demonstrates that plants closer to the cathode exhibited ca. three times faster shoot and root growth. This result shows that, with no addition of nutrients or water in the agar gel, water was efficiently transported by the electroosmosis toward the cathode, thus causing plants in the vicinity of the cathode to grow faster. An almost linear relationship between the shoot and root length with distance (from the anode) was observed, which reflects the distribution of water and/or available nutrients across the agar gel toward the cathode. Although different in plant dry mass, plants were grown near the anode as well as near the cathode. This indicated that the acid front from the anode and the base front from the cathode did not penetrate through the gel to a large extent to affect the plant health.

These results demonstrate that the process of nutrient uptake by the plants across their plasma membranes into the living cells, as well as plant growth was not affected by the electric field applied (ca. 70 V, electric field=1V/cm) in the above experiment if the electric field caused the rupture of the plasma membrane in plant cells, no plant growth would be observed in the agar gel. This indicates that the plants were not affected by the voltage or current flow (electrons) but by the ionic and water transport in the pore fluid. It is known that the dielectric breakdown of the cell plasma membranes will occur when electric fields in the range between 20 to 50 kV/cm are applied in suspension. Thus, the voltage applied in the electrokinetic soil remediation will not directly affect the health of the plants. However, the plants could be affected by ions transported in soil pore fluid by the induced electrokinetic phenomena.

EXAMPLE 2

Phytoextraction of Metal Contaminants from Soil Under an Applied Electric Field

This example demonstrates an enhanced removal of metals from soil by plants when an electric field is applied through the soil. Experiments were performed under conditions of (a) different soil pH and (b) with and without addition of ethylene diamine tetra-acetic acid (EDTA) which serves as a solubilizing agent for metals, including lead which was chosen as the metal contaminant. Soil used in the experiments was a 50/50 wt % mixture of sandy loam soil (available from Plantation Landscaping Services of College Station, Texas) and peat moss vermiculite (such as Peters Professional Potting Soil available from Lowes of College Station, Tex.). In some pots or plant growth cells, the soil mixture was acidified to either a pH of about 4 or a pH of about 6. The acidification was performed by titrating the soil with a 5% citric acid solution and the pH changes were monitored using an Accumet Model 915 pH meter. The amount of acid needed to alter the pH of 100 g of soil was calculated and this figure was used to prepare larger amounts of acidified soil.

To prepare contaminated soil, 19 kg of the soil mixture described above was placed in a Red Lion Model RLX3 Type C cement mixer and the drum rotation started. A lead solution was prepared by mixing 36.442 grams of lead nitrate (available from Aldrich Chemical Co., Milwaukee, Wis.) with 400 milliliters of water. The soil/lead solution was mixed until a homogeneous mix was attained. Grab samples were taken from the soil and digested using standard EPA SW846 Method 3050. The samples were filtered and the liquid filtrate was analyzed for lead using a Varian AA 875 Series Atomic Absorption Spectrophotometer. Following this method, a homogeneous lead contaminated soil was prepared with an initial lead concentration of about 1,200 ppm.

*Brassica juncea* (*L.*) *Czern*, (Florida broadleaf Indian mustard) seeds (obtianed from NK Lawn and Garden of Houston, Tex.) were used throughout the experiments. The soil pore fluid in all the experiments was deionized water, and deionized water was used to water the plants. In some experiments EDTA (ethylene diamine tetraacetic acid) at concentration of 7 mmol/kg of soil was used as a complexing agent to enhance the solubilization of lead in the soil.

Peat plant pots (Jiffy Pots) were filled with 200 g of soil. The soil was fertilized using 2 pellets of Triple Super Phosphate (SCOTTS brand) which were positioned in a hole made in the soil about 2 centimeters below the plant seeds. The hole was half filled in and 4 seeds of the Florida broadleaf Mustard were planted 1 cm below the soil surface.

In the pots where the electric field was applied, both anode and cathode electrodes (1"×3" iridium oxide coated titanium) were placed 2 inches deep into the soil. The electrodes were hooked up to an ISCO Model 494 Electrophoresis Power Supply, which was programmed to run under constant voltage conditions. The plants were allowed to grow to a height of about 5 centimeters before the voltage was applied across the soil. The plants were adequately watered daily and light was provided using a combined fluorescent/incandescent (320 Watt /180 Watt) lighting system or a 1000 W halide lamp (Agrosun from Hydrosun Garden products). The system was run from an Intramatrix timer to provide 16 hours of illumination per day. All the experiments were run for 40 days after which the plants were removed, dried overnight at 60° C., then digested using the standard EPA SW486 methods for analysis of lead.

The experimental treatments examined the following four soil conditions: (i) soil pH of 6; (ii) acidified soil pH of 4; (iii) acidified soil pH of 4 with EDTA; and (iv) acidified soil pH of 7.5; and (v) EDTA added to the starting composition of soil. Each of the four soil conditions were treated with either (1) a combination of phytoremediation and electrokinetics ("Phyto+EK") with a constant applied voltage of 100 Volts DC (VDC) and a total current of 150 mA, or (2) phytoremediation alone ("Phyto"). In each of the soild conditions, as well as a control, a set of three plant growth cells with 3 to 5 plants in each cell were used. The results are summarized in Table 1.

TABLE 1

Phytoextraction of lead from soil

| Treatment | Soil pH | Amendments | Plant Growth Cell | Plant Survivability after 38 days of phytoextraction | Lead ppm | Mean Lead ppm | Phyto + EK/ Phyto Ratio Lead (ppm) |
|---|---|---|---|---|---|---|---|
| Phyto | 6 | None | 1 | Yes | 649 | 843 | 2.4 |
| | | | 2 | Yes | 648 | | |
| | | | 3 | Yes | 1,232 | | |
| Phyto + EK | 6 | None | 4,5,6 | Wilted | 2,054 | 2,054 | |
| Phyto | 4 | None | 7 | Yes | 2,315 | 1,662 | 2.9 |
| | | | 8 | Yes | 1,770 | | |
| | | | 9 | Yes | 899 | | |
| Phyto + EK | 4 | None | 10,11 | No | 1,183 | 4,748 | |
| | | | 12 | Wilted | 8,313 | | |
| Phyto | 4 | EDTA | 13 | Yes | 970 | 1,347 | 1.3 |
| | | | 14 | Yes | 1,190 | | |
| | | | 15 | Yes | 1,880 | | |
| Phyto + EK | 4 | EDTA | 16 | No | 468 | 1,743 | |
| | | | 17 | No | 2,102 | | |
| | | | 18 | No | 2,658 | | |
| Phyto | 7.5 | None | 19 | Yes | 1,134 | 1087 | 1.9 |
| | | | 20 | Yes | 1,138 | | |
| | | | 21 | Yes | 990 | | |
| Phyto + EK | 7.5 | None | 22,23 | No | 2,008 | 2008 | |
| Control | 7.5 | None | 24* | Yes | 9.7 | | N/A |
| Control | 7.5 | None | 25* | Yes | 6.6 | | N/A |

Plants 24 and 25 were grown in uncontaminated soil for the same period to get background levels of lead phytoextraction.

The results in Table 1 demonstrate that under all of the conditions examined, the application of an electric field produced plants with much higher concentrations of metals compared to the plants grown with no electricity applied. On average, the lead concentration was about 2.1 times higher when phytoextraction was accompanied by electrokinetic transport of the lead in the soil. The greatest extraction was obtained in soil that was acidified to soil pH of 4 and when the electric field was applied (8,313 ppm). The results indicate that more metal is solubilized and accumulated in plants grown in soil having a lower soil pH, such as a pH of 4, compared to soil having a more neutral pH, such as a pH between about 6 and about 7.5. There was no significant increase in phytoextraction abtained when EDTA was added to the soil compared to the cells where no EDTA was added. Thus, of all the conditions examined, the best conditions for phytoextraction are when the soil is acidified to a pH of about 4 in combination with electrokinetic transport of the contaminants.

It is noteworthy that in most of the experiments where the electric field was applied, the plants did not survive beyond the 38 day period of metal accumulation. The death of these plants could be caused by metal accumulation exceeding the maximum plant capacitance for metal accumulation or by changes in soil pH. Because the cell size was small, the electrodes were placed only about 2 inches from the plants, so that the acid front could have harmed the plants.

Table 2 demonstrates that the acid front was indeed the cause of the plants death. Soil pH changes were measured in cells that were identical to those cells used for the plant growth treatments just described. Following six days of exposure at 48 VDC and current ranging between 20 and 45 mA, the pH measurements were made by taking small soil core samples across the cell between the anode and cathode. The results in Table 5 show pH profiles in cells with and without an applied electric field. While the pH did not change in the cell without an applied electric field, the cells where an electric field was applied experienced a pH near the anode of about 3.64 and a pH near the cathode of about 12.14. This experiment clearly demonstrates that the soil pH can be changed by application of an electric field between the anode and the cathode. If the pH in the vicinity of the electrodes is not controlled, such as by adding neutralizing agents, the soil near the anode becomes acidic and the soil near the cathode becomes basic depending on the electric field strength applied and the distance of the electrodes from the plants.

TABLE 2

Initial pH Experimental Results

| Cell # | Application of Electric Field | pH Location | pH |
|---|---|---|---|
| 1 | No | Near Edges | 6.83/7.44 |
| 2 | Yes | Near Anode/Cathode | 3.64/12.14 |

EXAMPLE 3

Counter-gravitational Contaminant Movement in Soil by Electrokinetics

Figure 9:
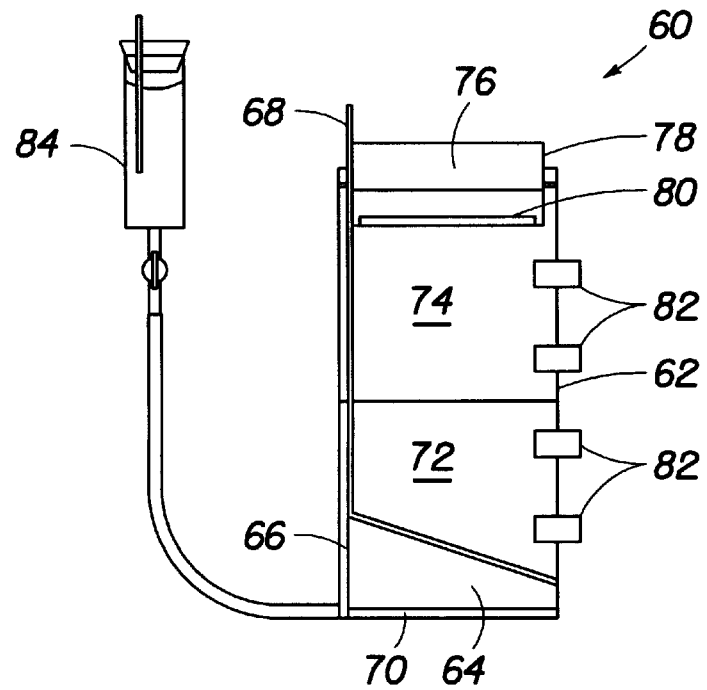
FIG. 9 is a schematic diagram of an apparatus for determination of counter-gravitational transport of ions in soil.

FIG. 9 is a schematic representation of the electrokinetics cell used to evaluate the vertical (counter gravitational) movement of lead contaminant in soil and generated protons from the anode compartment upwards towards the cathode compartment. The cell 60 consisted of a hollow transparent PVC tube 62 having a length of eleven (11) inches and an internal diameter of four (4) inches. The anode compartment 64 consisted of a hollow ceramic tube 66 having a diameter of 3.5 inches with a 45 degree bevel at the top. Tygon tubing 68 was attached to the top of the anode compartment 64 to allow any gas generated in the electrochemical reaction to escape. A screening material was then placed over the top of the ceramic tube. The anode 70, made of iridium-coated expanded titanium was secured to the bottom of the anode compartment. The anode compartment 64 was then sealed inside the PVC tube 62. Lead contaminated soil 72 having the composition previously described in Example 1 was packed into the column until it reached a height of 4.5" from the bottom. Another 4.5" of uncontaminated soil 74 was packed on top of the contaminated soil 72 giving a total soil column height of 9". The cathode compartment 76 was made from a hollow ceramic tube 78 with a screening material affixed to the bottom. The cathode 80 was placed on top of the soil column. The cell 60 was then filled with deionized water and a Mariotte tube 84 was used to maintain the level at about 1 inch above the cathode 80. An electrical current of about 200 mA was applied between the anode and cathode using an ISCO Model 494 Electrophoresis Power Supply.

Sample ports 82 along the side of the PVC tube 62 allowed for soil pore fluid samples to be taken from both the contaminated and uncontaminated soil zones. Soil pore fluid samples (10 ml) were removed from each of the sampling ports daily and the pH was measured using an Accumet Model 915 pH meter. The soil pore fluid samples were then analyzed on a Varian AA 875 Series Atomic Absorption Spectrophotometer to determine the lead concentration. Pore fluid was taken from the sampling ports on a daily basis in order to measure the pH and lead concentration. The pH of the cathode compartment was maintained at a pH of about 2 by the addition of citric acid. The experimental results showing counter-gravitational acid front penetration through the soil are shown in FIG. 10.

Figure 10:
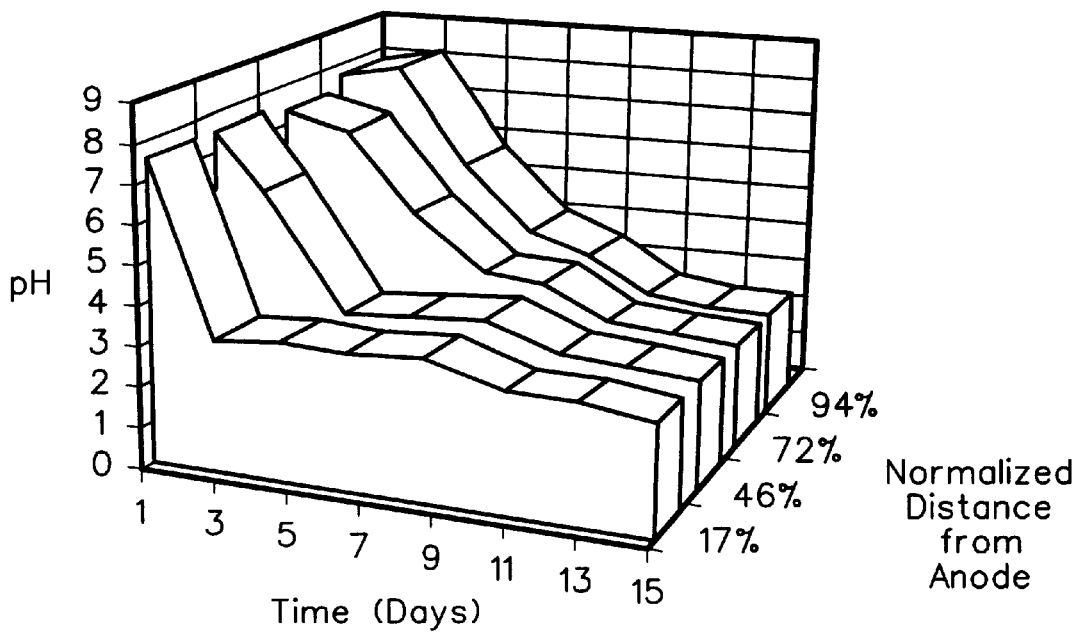
FIG. 10 is a three-dimensional graph of the counter-gravitational movement of an acid front through the soil from the anode toward the cathode.

FIG. 10 is a three dimensional bar graph illustrating the soil pH over 15 days at each of the four sampling ports resulting from the counter-gravitational acid front in cell 60. The increasing percentages correspond to the normalized distances of the sampling ports from the anode, i.e., to the distance the sample port is situated away from the anode. The graph shows that the rate at which the pH of the pore fluid decreases is related to distance from the anode, the soil closest to the anode exhibited the fastest drop in pH. As protons are generated at the anode by the water splitting reaction, the protons are transported by electromigration towards the cathode. After 15 days of cell operation, the soil pH throughout the entire cell, including the contaminated and non-contaminated zone of soil had decreased to between about 2.5 and about 3. These results clearly demonstrate a vertical counter gravitational movement of the acid front from the anode towards the cathode.

Figure 11:
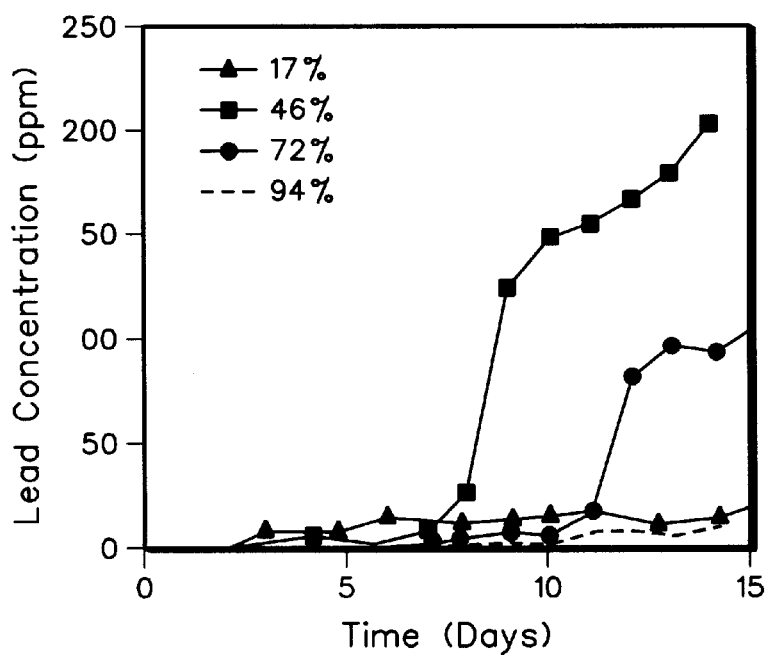
FIG. 11 is a graph of the counter-gravitational electrokinetic transport of lead in soil over time as it relates to a distance of the soil column in which movement was tested.

FIG. 11 is a graph of the lead concentration over time at each of the sampling ports. The graph illustrates the changes in lead concentration in the pore fluid as the pH front moves upward through the soil. The graph shows that at 17% of the total distance from the anode the lead concentration in the water increased quickly after two days of electrolysis. At greater distances from the anode, the time taken to observe lead in the pore fluid increased. The plot also shows that the highest lead concentration was observed in the pore fluid sampled from the port at 46% total distance from the anode, indicating an accumulation of lead in the middle of the column at the boundary between the contaminated and uncontaminated soil. The pore fluid sampled from the 72% total anode distance, which is located in the uncontaminated soil portion, also showed high levels of lead. This result indicated upward electromigration of lead ions and movement from a contaminated soil layer to an uncontaminated top soil layer.

The results clearly demonstrated an upward lead movement through the column into the top uncontaminated soil layer. The lead adsorbed in the contaminated soil at the bottom of the column was solubilized by the pH front penetrating from the anode and was transported counter-gravitationally towards the cathode by electromigration. As the pH front moved away from the anode more lead became dissolved and migrated towards the cathode. This explains why there is such a large lead concentration in the pore fluid in the middle portion of the column (46% total distance from the anode) in the contaminated soil zone and in the noncontaminated soil zone (75% total distance from the anode).

The above example demonstrates that an upward counter-gravitational transport of contaminants toward a non-contaminated root zone is a feasible approach, which can extend the application of phytoremediation to sites where the contaminant plume is located deeper in soil than the root zone. Also, an approach which involves adding a supplemental soil layer on top of the contaminated soil, planting contaminant accumulating plants in that added soil layer and bringing contaminants from the contaminated soil into the added soil layer can be used to apply phytoextraction to soils which can not support plant growth, such as in tight, low hydraulic permeability clayey soils. The supplemental soil or porous medium is preferably a porous, sandy type soil, suitable for plant growth. Contaminants frequently accumulate in a clayey layer below the soil surface because the soil particles are small and exhibit high surface area for adsorption of contaminants.

EXAMPLE 4

Counter-Gravitational Transport of Water in Soil by Electroosmosis

Figure 12:
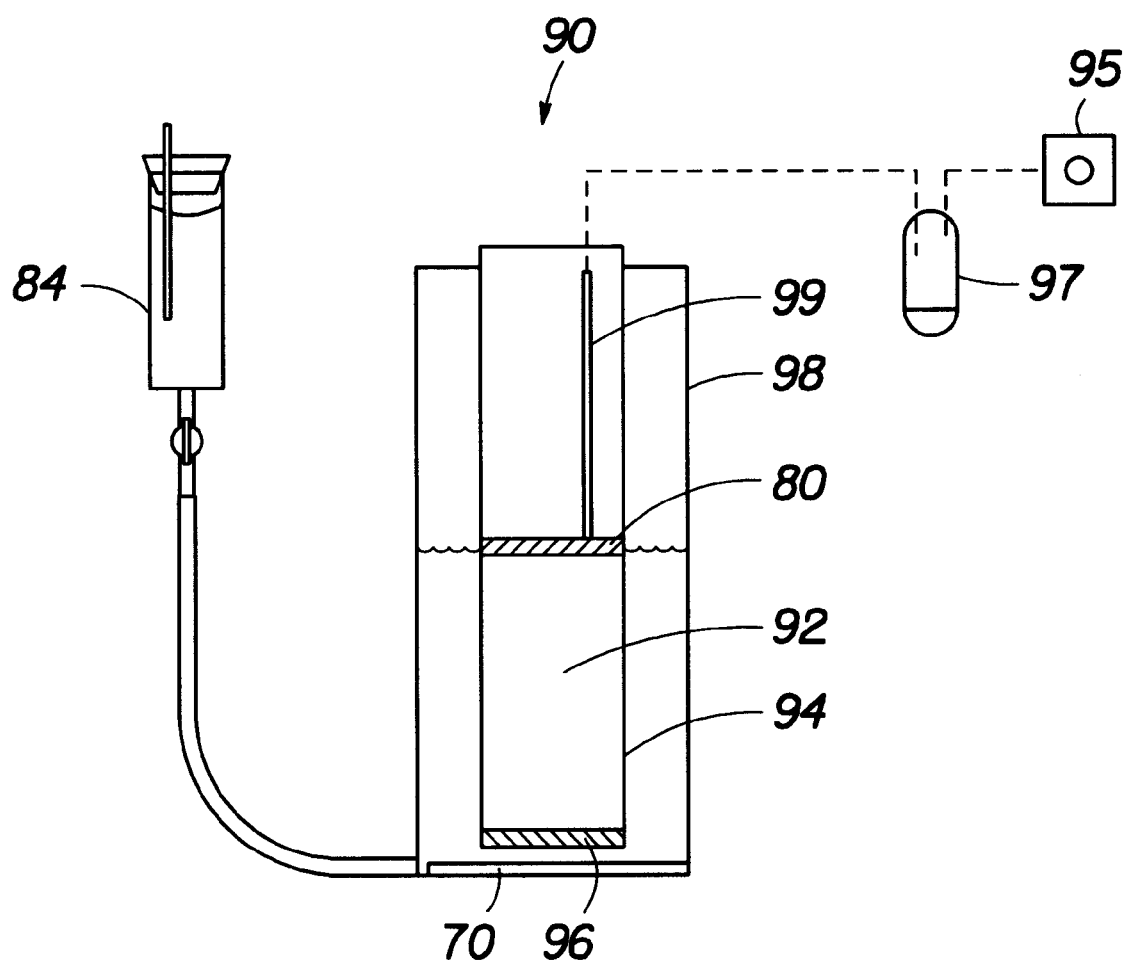
FIG. 12 is a schematic diagram of an apparatus for determining the counter-gravitational transport of water in soil by electroosmosis.

FIG. 12 is a schematic of the experimental apparatus 90 used to determine the counter-gravitational electroosmotic flow of water through a soil column 92. A soil column was prepared by packing 12" of uncontaminated soil into a transparent PVC tube 94 having a 2 inch diameter. The bottom of the tube was closed with a porous plate 96 covered with screening material. The soil column 92 was placed inside another transparent PVC tube 98 (4 inch internal diameter) and water was added until the level in the outer tube was as high as the cathode in the soil column. Both the anode and cathode were prepared as described in Example 3. A voltage was applied between the two electrodes using an ISCO Model 494 Electrophoresis Power Supply. The water level in the outer tube (cathode compartment) was maintained using a Mariotte tube 84. A needle 99 whose tip was positioned at the cathode water level was connected via tubing to a closed measuring cylinder 97, which was in turn connected to a small vacuum pump 95. As the water was electroosmotically transported upwards through the soil column to the cathode compartment, the over flow was displaced into the measuring cylinder by suction.

A constant voltage was applied between the electrodes 70,80. Table 3 shows the electroosmotic flow rate per hour as a function of voltage and current applied. It can be seen that as the applied voltage increased so did the counter-gravitational electroosmotic flow, demonstrating an approximately linear relationship between the voltage applied in soil and the electroosmotic flow. The current increased up to 150 V and it flattened out even with the increased voltage. These results indicate that the voltage is the driving force for the electroosmotic flow and not the applied current. This is in accordance with well-known Helmholtz Smolukhowski theory of the electrokinetic phenomena.

TABLE 3

Total flow rate due to electroosmotic flow
of pore fluid through a soil column.

| Applied Voltage V | Cell Current MA | Flow Rate ml/h |
|---|---|---|
|  | 0.0 | 0.0 |
| 100 | 30 | 4 |
| 300 | 70 | 15 |
| 500 | 150 | 19 |
| 600 | 150 | 28 |

A linear fit of the electroosmotic flow rate vs. voltage dependence, generated a line defined by y=0.0438x+0.0462, yielding a good correlation coefficient ($R^2$=0.971) This confirms a linear relationship between the counter-gravitational electroosmotic flow and the voltage applied in soil. From the slope of the line and the electric field (V/cm), the electroosmotic permeability coefficient yields (EOF flow rate in $cm^3$ /$Vcm^{-1}$) $1.2\times10^{-4}$ $cm^2$ $V^{-1}s^{-1}$. This value is characteristic for s sandy to loamy soils, such as that which was used in the experiment.

This example demonstrates the use of counter-gravitational transport of water in soil by electroosmosis which has application in the transport of non-charged contaminants from soil toward the plant root zone where they are extracted and accumulated by the plants.

EXAMPLE 5
Phytoextraction of Lead Contaminant from Soil where the Contaminant Plume is Located Deeper than the Root Zone Experiments were performed in a 30-kg plant growth chamber (8' inches wide, 12' inches deep, and 24 inches long) made of polyvinyl chloride (PVC). The anode wells were made from 14 inch long and 3 inch diameter ceramic tubes (Ferro Corp.). The base of the anodes was sealed onto a PVC plate, thus creating electrode wells closed at the bottom. The cathode well was made from ½ inch diameter ceramic tube (Ferro Corp) with a length of 6 inches. The cathode well was placed near the soil surface and was covered with soil from the growth chamber. Both anode and cathode electrodes were made of expanded iridium oxide coated titanium metal. The cathode well pH control was performed measuring the pH, and adding citric acid through a solenoid valve operated by a microcomputer controller. The plants were supplied with water and a nutrient solution from 5-gallon plastic drums (U.S. Plastics). Level sensors in the anode and cathode compartments activated solenoid valves on the drums to release the solutions when required. The system was fully automated and was controlled using a personal computer. Automated control and data acquisition was used to continually monitor and adjust the operating parameters of the system. Commercially available Lab-VIEW® graphical programming software was used to interface the computer with analog and digital boards (National Instruments). The software allowed control of the cells by periodically recording voltage, current, temperature and well fluid levels (through digital level sensors mounted in the electrode wells). Signals, both inputs and outputs, were conditioned through opto-isolation channels to insure the electrical separation of the computer and main power supply. The two anodes at the end of the chamber, and one centrally positioned cathode were connected to a Sorensen DCR 600-16T power supply which was programmed to operate under conditions of constant voltage. Upon completion of the experiments, the plants were removed, digested, and the lead content analyzed as previously described.

The soil bed was prepared with a four-inch layer of uncontaminated soil added on top of an eight-inch layer of lead contaminated soil. The cathode was positioned near the top surface of the soil (in the middle of the chamber) and two anode wells reached the bottom of the chamber so that the contaminant could be electrokinetically transported from the bottom contaminated soil into the uncontaminated soil where the plants were grown. The depth of the anodes was determined as previously described. Mustard plants, grown in the same conditions as described in Example 1, were transplanted from their peat plant pots to the soil beds when they reached a height of 5 cm. The plants were placed in the growth chamber in rows of three, 9 plants between the cathode and a first anode and 9 plants between the cathode and a second anode. The electrical current applied ranged from 40 mA to 167 mA depending on the plant watering conditions. The plants were harvested after 15 days of growth and prepared for trace metal analysis following the previously described procedure. The plant root length within the growth period did not exceed the depth of the top uncontaminated soil in the bed. The plants between the cathode and the first anode exhibited lead concentration of 661 ppm and the plants between the cathode and the second anode exhibited 512 ppm lead (an average of 507 ppm). In uncontaminated soil, the plants should exhibit no accumulation of lead. However, in the conditions of induced upward electrokinetic transport of lead from contaminated soil into the uncontaminated rhizosphere, a 78 fold increase in lead concentration was obtained compared to average background level of lead in plants grown in uncontaminated soil (7.5 ppm, cf., Table 1).

This example demonstrated an efficient counter-gravitational electrokinetic transport of lead from a deeper contaminated soil into an uncontaminated rhizosphere where the contaminants were removed by phytoextraction.

EXAMPLE 6
Phytoextraction in Conditions of Electrokinetic Transport of Contaminants and Control of Soil pH To test various methods of pH control for the process of electrokinetic phytoremediation, a small field-scale test cell was constructed by burying ¼" plywood panels into the ground with dimensions of 64 in.×36 in.×20.5 in. (L×W×D). The bottom ten inches of the enclosure were filled with a five-inch deep layer of sand followed by a five-inch layer of Kaolin clay, which served as a clayey lens, which ensured no penetration of contaminants to deep soil layers. The enclosure was divided into two equal parts by driving a 36 in.×20 in.×¼ in. PVC (polyvinyl chloride) sheet in the center of the enclosure. Each half of the enclosure was then filled with approximately 171 kg of either contaminated (ca 1,200 ppm) or uncontaminated soil, depending on the requirements of the experiment.

Figure 13:
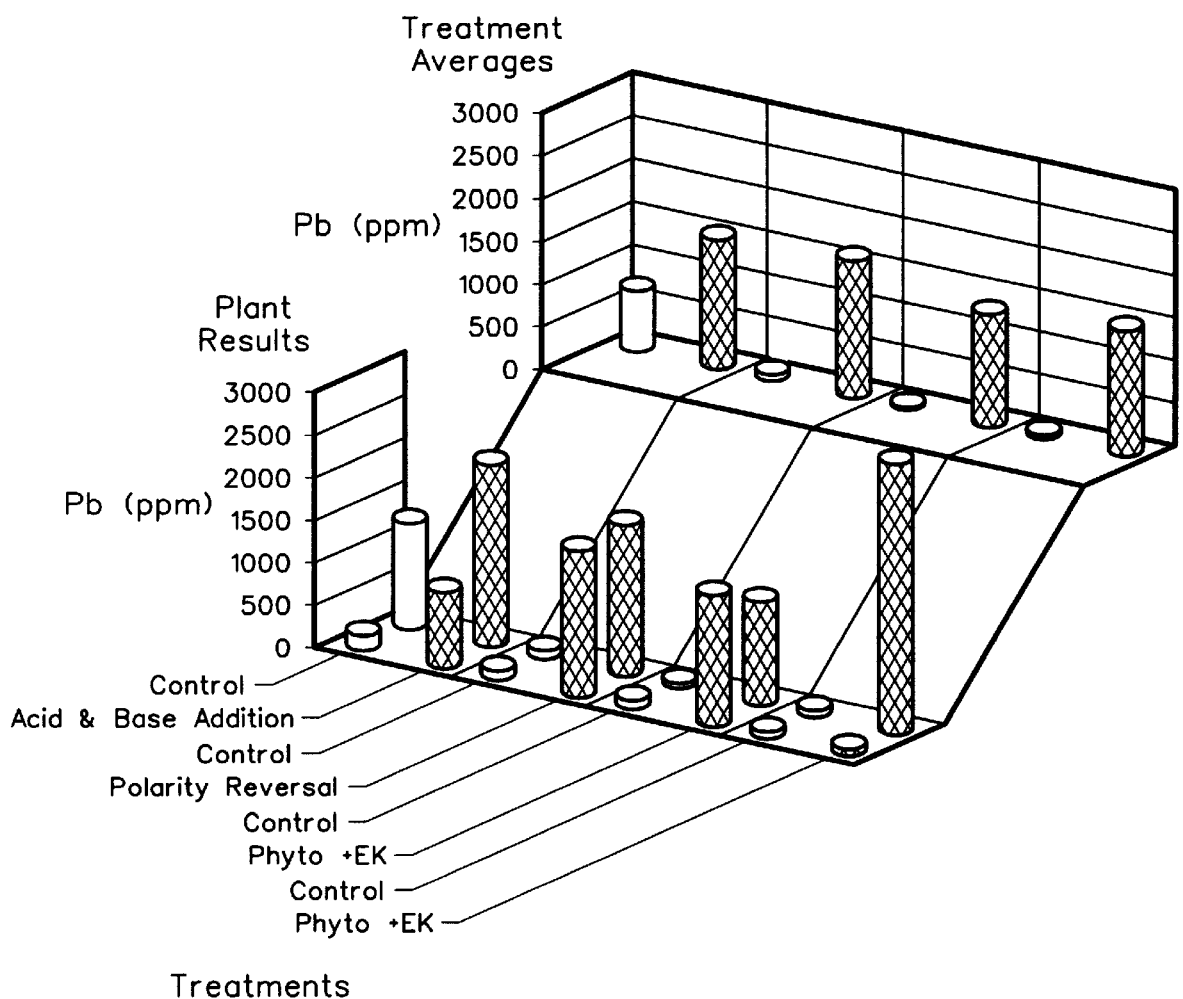
FIG. 13 is a graph of the lead accumulation in plants in condition with and without the use of an applied electric field as it relates to different methods of soil pH control which included: (i) addition of an acid and base to the cathode and anode, (ii) reversing the polarity of the electrodes once per hour, and (iii) no control of soil pH other than by the electrokinetic processes in soil. The average lead accumulation value for each treatment is shown on the topmost grid.

The mustard plants were first grown to relatively large plant mass. A group of four plants that were similar in height and leaf size were tested in such a way that two of the plants would be in the electric field (electrodes were inserted around them 2 inches deep and about 1–2 inches away from the plants), and the remaining two plants were used as a control where no electric field was applied. Power was then applied in a constant current mode at 0.5 A. In this set of experiments, three methods for controlling the soil pH during electrokinetic process were investigated: (i) 30 ml of 20% citric acid and 2M sodium hydroxide (NaOH) were sprayed daily at the cathode and anode electrodes, respectively, to control the acid and base generation at the electrodes; (ii) electrode polarity was reversed at a predetermined rate (once per hour), and (iii) no pH control other than by the electrokinetics processes was applied. Plants were allowed to grow for 12 days. Approximately 1.5–2 gallons of tap water was applied daily per entire bed surface area. The plants were then harvested and analyzed for lead. FIG. 13 is a graphical presentation of the lead accumulation in the plants grown in conditions where soil pH was controlled using three methods described above.

Several conclusions can be drawn from the results shown in FIG. 13. First, all experiments indicated that the plants under the electrokinetic control showed significantly (up to two orders of magnitude) higher average lead accumulation compared to those in the control sets where no electric field was applied. Second, the polarity reversal system for the electrokinetic control of soil pH performed as well as that where the acid and base were added along the electrodes. This indicated that in a fill-scale field operation of the electrokinetic phytoremediation system, a simple reversing of the polarity of the electrodes can be as efficient for soil pH control as the addition of expensive chemicals. In this way the operating costs for the electrokinetic process could be reduced because no storage and handling of chemicals is needed. In this example, a short term (12 days) and fast electrokinetic accumulation of lead was achieved in plants which were first grown to an appreciable plant mass.

Controlling the pH of the soil is an important factor in the process for maintaining both healthy plant growth and contaminant solubilization. Methods for adjusting the soil pH were investigated in more detail in a separate small field scale experiment. The electrodes were inserted into the soil about 6 inches apart and a constant current of 0.5 A was applied between them. The pH of the soil was monitored by taking soil core samples between the anode and cathode at different times during the process. Table 4 summarizes the results which compare the changes in soil pH in the process where no pH was controlled and where pH was controlled by the polarity reversal method.

TABLE 4

Changes in soil pH during electrokinetic phytoremediation process where pH was not controlled and where polarity reversal method was used to control the advancement of acid and base fronts in soil.

| Treatment Time | No pH Control Performed Relative Distance from Anode | | | | Soil pH Controlled by Polarity Reversal Method Relative Distance from Anode | | | |
| --- | --- | --- | --- | --- | --- | --- | --- | --- |
| (days) | 0.1 | 0.3 | 0.7 | 0.9 | 0.1 | 0.3 | 0.7 | 0.9 |
| 3 | 4.1 | 7.2 | 7.4 | 8.0 | 8.0 | 8.1 | 8.0 | 7.3 |
| 6 | 3.3 | 4.3 | 8.0 | 9.0 | 6.1 | 7.4 | 6.6 | 3.9 |
| 8 | 2.7 | 4.1 | 8.1 | 9.5 | 5.8 | 7.1 | 5.2 | 3.9 |
| 10 | 2.3 | 4.0 | 6.3 | 10.3 | 4.2 | 6.2 | 7.1 | 4.2 |

Table 4 shows that over 10 days of treatment without pH control, the pH at the anode side of the test bed dropped from starting pH 7.5–8.0 to pH 4, indicating a strong acidification of soil. At the cathode side the pH of the soil increased from 8 to a pH of 10.3. These control results confirmed that acid and base are being generated in the soil, causing a pH gradient from the anode to the cathode. Optimum soil pH would be the one at which the metal can be solubilized (e.g., pH 3–4) and still not too low to affect the mustard plant viability (around pH 4). In the polarity reversal method for soil pH control, the electrode which first produces an acid and acidifies the soil (serving as an anode) is then made to produce base and neutralize much of the acid (serving as a cathode). At the same electrode, a portion of the acid produced in the first step is neutralized by the base produce in the second step and the low pH problem in the vicinity of the anode is prevented. Because protons are transported through the soil much faster than hydroxyl ions (e.g., protons have a higher transference number), a general trend of the polarity reversal method is to yield a controlled overall acidification of the entire soil. Table 5 shows that a slower and more moderate acidification is obtained using the polarity reversal method compared to using no pH control. During 10 days of soil treatment the soil was acidified relatively uniformly from the anode toward the cathode, with soil pH kept no lower than 3.9. This soil pH is ideal for not affecting the plant health and the plant growth and at the same time to provide enough hydrogen ions for solubilization of metal contaminants adsorbed on soil.

While the foregoing is directed to the preferred embodiment of the present invention, other and further embodiments of the invention may be devised without departing from the basic scope thereof, and the scope thereof is determined by the claims which follow.

What is claimed is:

1. A method for removing a contaminant from a contaminated porous medium, comprising:
   providing a layer of a supplemental porous medium over the contaminated porous medium;
   providing a plant with roots extending into the supplemental porous medium, wherein the plant is capable of accumulating the contaminant;
   applying an electric field between the contaminated porous medium and the supplemental porous medium so that the contaminant is electrokinetically transported through the contaminated porous medium upwardly into the supplemental porous medium; and
   maintaining the supplemental porous medium around the roots at a pH between about 3 and about 10.

2. The method of claim 1, wherein the electrokinetic transport is electroosmosis, electromigration, dielectrophoresis or combinations thereof.

3. The method of claim 1, further comprising:
   maintaining the supplemental porous medium in a region around the roots at a pH between about 4 and about 8.

4. The method of claim 1, further comprising:
   maintaining the pH of the porous medium under the applied electric field to enhance extraction of contaminants from the contaminated porous medium to the plants.

5. The method of claim 1, wherein the electric field is applied between one or more anodes and one or more cathodes, and farther comprising:
   adding acid to the cathode.

6. The method of claim 1, wherein the electric field is applied between one or more anodes and one or more cathodes, and further comprising:
   adding base to the anode.

7. The method of claim 1, further comprising:
   periodically reversing the polarity of the anodes and cathodes in the porous medium.

8. The method of claim 1, wherein a major portion of the contaminant is below the roots.

9. The method of claim 1, wherein the electrokinetic transport comprises counter-gravitational electrokinetic transport of the contaminant.

10. The method of claim 1, wherein the electrokinetic transport comprises counter-gravitational electroosmosis.

11. The method of claim 1, further comprising:
   positioning one or more anodes in the contaminated porous medium and one or more cathodes in the supplemental porous medium for applying the electric field.

12. The method of claim 11, wherein the contaminants are located in a contaminated region of the contaminated porous medium, the method further comprising:

positioning the one or more anodes below the contaminated region, wherein the electric field applied between the one or more anodes and the one or more cathodes extends through at least a portion of the contaminated region.

13. The method of claim 11, further comprising:

positioning one or more electrodes in the supplemental porous medium around the plants and one or more electrodes in the contaminated porous medium.

14. The method of claim 1, further comprising:

positioning electrodes in the contaminated porous medium for applying the electric field; and electrokinetically transporting the contaminant from a lower region to an upper region.

15. The method of claim 11, further comprising:

providing one or more wells in the contaminated porous medium for housing an anode or a cathode.

16. The method of claim 11, wherein the one or more anodes and the one or more cathodes are inserted directly into the contaminated porous medium.

17. The method of claim 1, wherein the supplemental porous medium supports plant growth.

18. The method of claim 1, wherein the supplemental porous medium is soil, sediment, sludge, composted material, or combinations thereof.

19. The method of claim 1, wherein the contaminant comprises an ionic contaminant.

20. The method of claim 1, wherein the contaminant comprises a heavy metal.

21. The method of claim 1, wherein the contaminant is a heavy metal, and the heavy metal is lead, chromium, cadmium, nickel, copper, cesium, uranium, technetium, or combinations thereof.

22. The method of claim 1, wherein the contaminant comprises a non-ionic contaminant.

23. The method of claim 1, wherein the contaminant is a non-charged organic molecule, hydrocarbon, chlorinated hydrocarbon, polyaromatic hydrocarbon, or combinations thereof.

24. The method of claim 1, wherein the contaminated porous medium does not support plant growth and supplemental porous medium does support plant growth.

25. The method of claim 1, wherein the contaminated porous medium is clay.

26. The method of claim 1, wherein the supplemental porous medium is sand, silt, large-pore soil, sediment, sludge, composted material, or combinations thereof.

27. The method of claim 1, further comprising:

electrokinetically transporting nutrients to the roots.

28. The method of claim 1, further comprising:

electroosmotically transporting water to the roots.

29. The method of claim 28, wherein the water is drawn from a water source within the contaminated porous medium.

30. The method of claim 1, wherein the electrokinetic transport of the contaminants is started before providing the plants.

31. The method of claim 1, further comprising:

allowing the plants to achieve a certain mass before applying the electric field.

32. The method of claim 1, further comprising:

extracting the contaminants from the supplemental porous medium into the roots; and harvesting the plants.

33. The method of claim 1, wherein the electric field is a non-uniform electric field.

34. The method of claim 33, wherein the non-uniform electric field is pulsed direct current, alternating current, or combinations thereof.

35. The method of claim 1, further comprising:

positioning one or more cathodes in the contaminated porous medium and one or more anodes in the supplemental porous medium for applying the electric field.

36. The method of claim 35, wherein the contaminants are located in a contaminated region of the contaminated porous medium, the method further comprising:

positioning the one or more cathodes below the contaminated region, wherein the electric field applied between the one or more anodes and the one or more cathodes extends through at least a portion of the contaminated region.

37. A method for removing a contaminant from a contaminated region below the surface of soil, comprising:

providing a layer of a supplemental porous medium over a contaminated porous medium;

providing a plant with roots extending into the porous medium, wherein the plant is capable of accumulating the contaminant;

positioning one or more electrodes having a first polarity above the contaminated region in the supplemental porous medium and extending one or more electrodes having a second polarity below the contaminated region to provide counter-gravitational contaminant transport, wherein the electric field encompasses the contaminated region;

applying an electric field between the one or more electrodes having a first polarity and the one or more electrodes having a second polarity so that the contaminant is electrokinetically transported counter-gravitationally to the roots of the plant.

38. The method of claim 37, further comprising:

estimating a time period when the plants will have achieved a desired plant mass for accumulating metal;

measuring the depth of the contaminated region; and controlling the electric field to provide counter-gravitational electrokinetic transport of contaminants at a desired rate so that the contaminants reach the roots during the time period.

39. The method of claim 37, wherein the contaminated region is inaccessible to the roots of the plants.

40. The method of claim 38, further comprising:

turning off the electric field when the plants reach their maximum contaminant accumulation capacity;

harvesting the plants from the soil;

growing new plants in the soil;

after a time period when the new plants will have achieved a desired plant mass for accumulating metal, turning the electric field back on.

41. The method of claim 40, further comprising repeating the steps of claim 40.

42. The method of claim 37, wherein the one or more electrodes having a first polarity is horizontal.

43. The method of claim 37, further comprising:

periodically reversing the polarity of the electrodes.

44. The method of claim 1, wherein the contaminated porous medium does not support plant growth.

* * * * *